No. 723,011. PATENTED MAR. 17, 1903.
P. NAEF.
APPARATUS FOR TREATING LIQUIDS WITH GASES.
APPLICATION FILED APR. 26, 1899.
NO MODEL.

Witnesses:
Inventor
Paul Naef
By James L. Norris
Atty.

UNITED STATES PATENT OFFICE.

PAUL NAEF, OF NEW YORK, N. Y.

APPARATUS FOR TREATING LIQUIDS WITH GASES.

SPECIFICATION forming part of Letters Patent No. 723,011, dated March 17, 1903.

Application filed April 26, 1899. Serial No. 714,544. (No model.)

*To all whom it may concern:*

Be it known that I, PAUL NAEF, Ph. D., chemical engineer, a citizen of Switzerland, and a resident of New York, in the county of New York and State of New York, have invented certain new and useful Apparatus for Treating Liquids with Gases, of which the following is a specification.

This invention relates to an apparatus for the treatment of liquid and gaseous fluids, and is more especially designed for the precipitation of bicarbonates from ammoniated brine by means of carbonic-acid gas, and has for its object to increase its capacity and efficiency as well as to render more simple such apparatus.

To these ends my invention consists in the features and in the construction, combination, and arrangement of parts hereinafter described, and particularly pointed out in the claims following the description, reference being had to the accompanying drawings, wherein—

Figure 2:
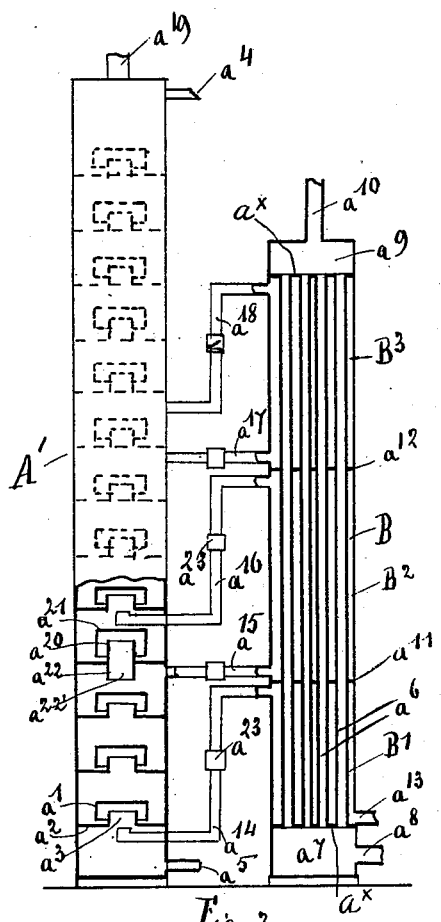
Figure 1:
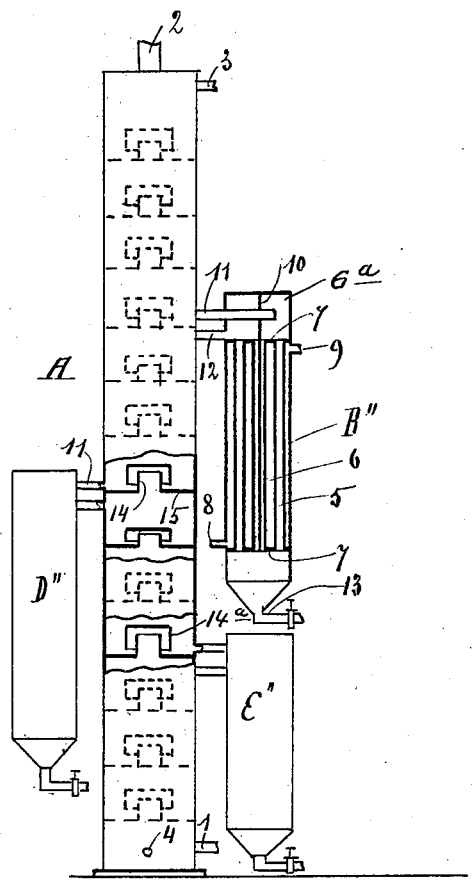

Figure 1 is a view in side elevation, partly in section, of one form of my improved apparatus; and Fig. 2 is a similar view of a somewhat different arrangement of the apparatus embodying substantially the same principle of operation.

Referring to Fig. 1 of the drawings, the letter A indicates a column, which may be of the usual construction, employed for the purposes of this invention and which contains distributing devices, such as apertured diaphragms, which will be hereinafter more fully described. It is provided at its bottom with an inlet 1, through which gas is pumped into the column, and the latter is provided at its top with an outlet 2, through which the gas is discharged. The liquor enters the column through the pipe 3 at the top of said column and is discharged through pipe 4 at the bottom thereof. In connection with the column are employed means to cool or heat the liquid as the operation is being carried out. For the purpose of heating or cooling the liquid I preferably provide an arrangement in which the liquid is successively and repeatedly conducted from the column and passed through suitable temperature-regulators and is again returned to the column. In Fig. 1 of the drawings three vessels B'', D'', and E'' are provided, which communicate with the interior of the column in the manner hereinafter explained. Each of the said vessels consists of an upright cylinder provided with a system of vertical pipes 5, which are of less length than the cylinder itself. The space 6 surrounding the pipes is closed at the top and bottom by end plates 7, which are suitably perforated, and such perforations are fitted to the ends of pipes 5 in the manner similar to boiler-tubes. The pipe 8 communicates with the lower end of space 6, and the pipe 9 communicates with the upper end thereof. The cooling fluid enters the space 6 by way of the pipe 8 and is discharged from said space through pipe 9. The space $6^a$ in the upper part of the vessel B'' is preferably divided into two compartments by a vertical partition 10. Liquor is fed through pipe 11 from the column into one of the said compartments, passes downward through the pipes 5, communicating with said compartment, and returns upward through the other of said pipes 5, that communicate with the other compartments, and from thence returns to the column A through pipe 12. The space $6^b$ below the system of pipes acts as a settling-chamber for solid materials, which materials may be withdrawn from time to time from the conical bottom of vessel B'' through the valved pipe 13. The lower part of the vessel B'' may be provided with any suitable agitator; but as such forms no part of my invention such agitator is not shown. Various means may be adopted for causing the liquid to pass from the column through the temperature-regulator B'' and from the latter back into the column; but I prefer to effect such circulation of liquor by gravity.

Fitted in the column at suitable distances apart are transverse partitions 15, arranged one above another and each centrally apertured, as shown, each partition being provided with an annular or tubular flange 14, which surrounds the central aperture and projects a suitable distance above the partition. Arranged over and surrounding the upper end of such tubular flanges are bells $14^a$, the flanges and bells forming a species of trap. By means of the partitions described a plurality of compartments are formed in the column, and in those compartments from which the pipes 11 lead to the temperature-regulators the tubular flanges are made higher, whereby a space for containing liquid is formed above the partitions 15, from which the liquid flows to the outlet-pipes 11 by gravity. The construction of the temperature-regulators D'' and E'' is precisely the same as that above described with reference to temperature-regulator B''.

If used in connection with the ammonia-soda process, the operation of the apparatus shown in Fig. 1 is as follows: Carbonic-acid gas is pumped into the column through the pipe 1 and ascends, passing from one compartment to another of the column through the tubular flanges 14 and beneath the bells 14$^a$, which flanges and bells cause the gas to be thoroughly distributed throughout the compartments. The waste gas leaves the column through the pipe 2, and ammoniated brine enters the column through the pipe 3, and in descending the brine is brought into contact with the ascending carbonic-acid gas. Through the uppermost pipe 11 the brine passes into the cooler B'' and reënters at a low temperature through the pipes 12. In the same manner the ammoniated brine passes successively through the coolers D'' and E'', and each time it passes through one of such coolers it is reduced to a low temperature. Sludge containing bicarbonate may be withdrawn from time to time as may be desired from the lower conical portion of the temperature-regulators B'', D'', and E''.

By means of the construction and arrangement before described the capacity of the apparatus is greatly increased. In practice the vessels B'', D'', and E'' are so arranged that they may be disconnected for cleaning the same without interference with the operation of the column. After the liquor leaves the column through the outlet-pipe 4 it is passed through suitable settling-tanks, from which the bicarbonate may be removed from time to time.

The apparatus shown in Fig. 2 comprises the column A', which is fitted with suitable distributing devices, such as bells $a'$, which are placed above partitions $a^2$. They are provided with central openings and tubular flanges in the manner above described. The liquor is fed into the column through the pipe $a^4$ at the top thereof and leaves through the pipe $a^5$ at the bottom. In connection with the column A' are employed means to regulate the temperature of the gaseous fluid during the progress of the reaction. Such means consist of a cylinder inclosing a series of vertical pipes $a^6$. The heating or cooling fluid is introduced into the space $a^7$ below the pipe system through the pipe $a^8$ and passes up through the pipes and leaves the vessel B'' through the space $a^9$ by the pipe $a^{10}$. The space surrounding the pipes $a^6$ is divided into compartments B', B$^2$, and B$^3$ by partitions $a'''$, $a^{12}$, and $a^\times$. Gas or vapor enters the compartment B' through pipe $a^{13}$ to the bottom thereof and ascending said compartment is conducted from the latter by the pipe $a^{14}$, which extends into the bottom of the column A' beneath the lowermost compartment therein. After passing through several of the compartments in the column the gas or vapor is conducted by the pipe $a^{15}$ into the lower part of the compartment B$^2$ of the temperature-regulator and after ascending the latter reënters the column through the pipe $a^{16}$. The gas or vapor again ascends through several of the compartments of the column and leaves the latter through the pipe $a^{17}$, which conducts it into the lower portion of the compartment B$^3$ of the temperature-regulator and reënters the column through pipe $a^{18}$. The waste gas is discharged from the top of the column through the pipe $a^{19}$. During the discharge of the gas or vapor through each of the compartments B', B$^2$, and B$^3$ the temperature is regulated or brought to a suitable temperature for the process being carried out. In the drawing is shown an obstruction consisting of a water-lute constituted by extending the tubular flange $a^{20}$ beneath the partition as well as above it and also by increasing the height of the bells surrounding the upper ends of such flange. This arrangement allows the descent of the liquid through the central opening $a^{22}$ in the transverse partitions of the column, but forms such a depth of liquid at the point indicated that the gas does not penetrate through the liquid, but passes instead through the pipe $a^{15}$ into the compartment B$^2$. The flange $a^{22}$ below the transverse partitions allows the accumulation of gas under such partitions, whereby a gas-space is formed and the overflow of liquid into the temperature-regulator B is prevented. Check-valves $a^{23}$ of ordinary construction are preferably connected with the pipes $a^{14}$, $a^{16}$, and $a^{18}$ to prevent back pressure. As these valves are of ordinary and well-known construction and form no part of this invention, they are merely conventionally shown.

If the apparatus is used in connection with the ammonia-soda process, the operation is as follows: Ammoniated brine enters the column through the pipe $a^4$ at the top of the column, and the product, consisting of liquor holding bicarbonate in suspension, is discharged from the column through the pipe $a^5$ at the bottom. The cooling fluid is introduced into the space $a^7$ at the bottom of the temperature-regulator B through the pipe $a^8$ and ascends through pipes $a^6$ into the space $a^9$ at the top and is discharged through pipe $a^{10}$. Carbonic acid is pumped through the pipe $a^{13}$ into the bottom of the compartment B$^5$ and passes at a low temperature into the column through the pipe $a^{14}$, leaves the column through pipe $a^{15}$, and is introduced into the lower portion of the compartment B$^2$, ascends the latter, and reënters the column through pipe $a^{16}$. After ascending several of the compartments of column A' it again leaves the latter through pipe $a^{17}$ and enters the lower portion of the uppermost compartment B³ and after passing up through the latter again enters column A' through pipes $a^{18}$. The waste gas is discharged from the top of the column by the pipe $a^{19}$. The cooling in vessel B (shown in Fig. 1) and also in vessel B'', D'', and E'' in Fig. 1 can be conveniently and economically effected by passing cold gaseous fluids through these vessels. This cold fluid may be produced by compressing the gas and expanding it in said compartments, or any other cold gaseous fluid or liquid may be employed. As before stated, instead of employing the temperature-regulators for cooling they may be employed in carrying out processes in which the liquid is heated, and in such cases it is merely necessary to pass a heating agent through them instead of a cooling agent.

Instead of providing the temperature-regulators with vertical pipe systems for cooling or heating the liquid any suitable cooling or heating means may be provided for the purpose.

Having described my invention, what I claim as new is—

1. In an apparatus of the class described, the combination with a vertical column having a liquid-inlet and a gas-outlet at its top, and a liquid-outlet and a gas-inlet at its bottom, of centrally-apertured transverse partitions arranged one above the other in the column and provided with vertical tubular flanges about said central apertures, bells arranged over the upper ends of the tubular flanges, temperature-regulators arranged exteriorly of said column, means for causing the descending liquid to flow successively from one compartment of the column to the said temperature-regulators and from the latter back into another compartment of the column, substantially as and for the purpose specified.

2. In an apparatus of the class described, the combination with a vertical column having a liquid-inlet and a gas-outlet at its top, and a liquid-outlet and a gas-inlet at its bottom, of centrally-apertured transverse partitions arranged one above the other in the column, and provided with vertical tubular flanges about such central apertures, bells arranged over the upper ends of the tubular flanges, temperature-regulators arranged exteriorly of said column, each of said temperature-regulators comprising a vertical cylinder provided with a plurality of pipes, means for causing the descending liquid to flow successively from the column to the temperature-regulators through the pipes and thence back to the column, and means for passing a temperature-regulating agent about the said pipes, substantially as and for the purpose specified.

3. In an apparatus of the class described, the combination with a vertical column having a liquid-inlet and a gas-outlet at the top and a liquid-outlet and a gas-inlet at its bottom, of centrally-apertured transverse partitions arranged one above the other in the column, and provided with vertical tubular flanges about such central apertures, bells arranged over the upper ends of the tubular flanges, temperature-regulators arranged exteriorly of the said column, each of the said temperature-regulators comprising a vertical cylinder provided with a plurality of vertical pipes, transverse heads or partitions surrounding the ends of said pipes and forming a space about the latter, a pipe for conducting liquid from one compartment of the column to the cylinder, means for causing the liquid to circulate through said pipes, a pipe for conducting the liquid from the cylinder back into another compartment of the column, and means for passing a temperature-regulating agent through the space about the pipes, the temperature-regulator being so arranged that the liquid flows successively through the temperature-regulators, as and for the purpose specified.

4. In an apparatus of the class described, the combination with a vertical column having a liquid-inlet and a gas-outlet at its top, and a liquid-outlet and a gas-inlet at its bottom, of centrally-apertured partitions arranged one above the other in the column provided with vertical tubular flanges about said apertures, bells arranged over the outer ends of the tubular flanges, temperature-regulators arranged exteriorly of said column, each of said temperature-regulators comprising a vertical cylinder provided with a plurality of vertical pipes transverse heads or partitions surrounding the ends of the pipes and forming a space about the latter, a vertical partition dividing the upper end of the cylinder into two compartments, a pipe for conducting liquid from one compartment of the column to one of said compartments, a pipe for conducting the liquid from the other compartment to another compartment of the column, means for passing a temperature-regulating agent through the space about the pipes, the temperature-regulators being so arranged that the liquid flows through the same successively, as and for the purpose specified.

5. In an apparatus of the class described, the combination with a vertical column having a liquid-inlet and a gas-outlet at its top and a liquid-outlet and a gas-inlet at its bottom, of centrally-apertured partitions arranged one above the other in the column, and provided with vertical tubular flanges about such central apertures, bells arranged over the upper ends of the tubular flanges, temperature-regulators arranged exteriorly of said column, means for causing the descending liquid to flow successively from one compartment of the column to the said temperature-regulators and from the latter back into another compartment of the column, and means for withdrawing precipitates from the bottoms of the temperature-regulators, substantially as described.

6. In an apparatus of the class described, the combination with a vertical column having a liquid-inlet and a gas-outlet at its top and a liquid-outlet and a gas-inlet at its bottom, of centrally-apertured transverse partitions arranged one above the other in the column and provided with vertical tubular flanges about such central apertures, bells arranged over the upper ends of the tubular flanges, a temperature-regulator arranged exteriorly of the column, means for conducting the fluid from one of the compartments of the column to the temperature-regulator, means for conducting said fluid from the temperature-regulator to another of said compartments, and means for passing a temperature-regulating agent through the temperature-regulator for the purpose specified.

7. In an apparatus of the class described, the combination with a vertical column having a liquid-inlet and a gas-outlet at its top and a liquid-outlet and a gas-inlet at its bottom, of centrally-apertured transverse partitions arranged one above the other in the column and provided with vertical tubular flanges about said aperture, said partitions dividing the column into a plurality of compartments, bells arranged over the upper end of the tubular flanges, a temperature-regulator arranged exteriorly of the column and comprising a vertical cylindrical casing provided with a system of pipes about which the temperature-regulating agent is adapted to be passed, a pipe leading from one of the compartments of the column into said temperature-regulator, and a return-pipe leading from said temperature-regulator to another compartment of the column, substantially as described.

8. In an apparatus of the class described, the combination with a vertical column having a liquid-inlet and a gas-outlet at its top, and a liquid-outlet and a gas-inlet at its bottom, of centrally-apertured transverse partitions arranged one above the other in the column, and provided with vertical tubular flanges, a temperature-regulator exterior of the column, means for conducting the fluid from one of the compartments of the column to the temperature-regulator, means for conducting said fluid from the temperature-regulator to another of said compartments, the tubular flanges in the compartments communicating with the temperature-regulator being of greater height than the remaining flanges, and means for passing a temperature-regulating agent through the temperature-regulator, as and for the purpose specified.

Signed at New York, in the county of New York and State of New York, this 25th day of April, A. D. 1899.

PAUL NAEF.

Witnesses:
R. M. WATSON,
SAMUEL W. ROMAIN.